Inventors
George Hazelton
William A. Barker
George W. Gibson
By their Attorney

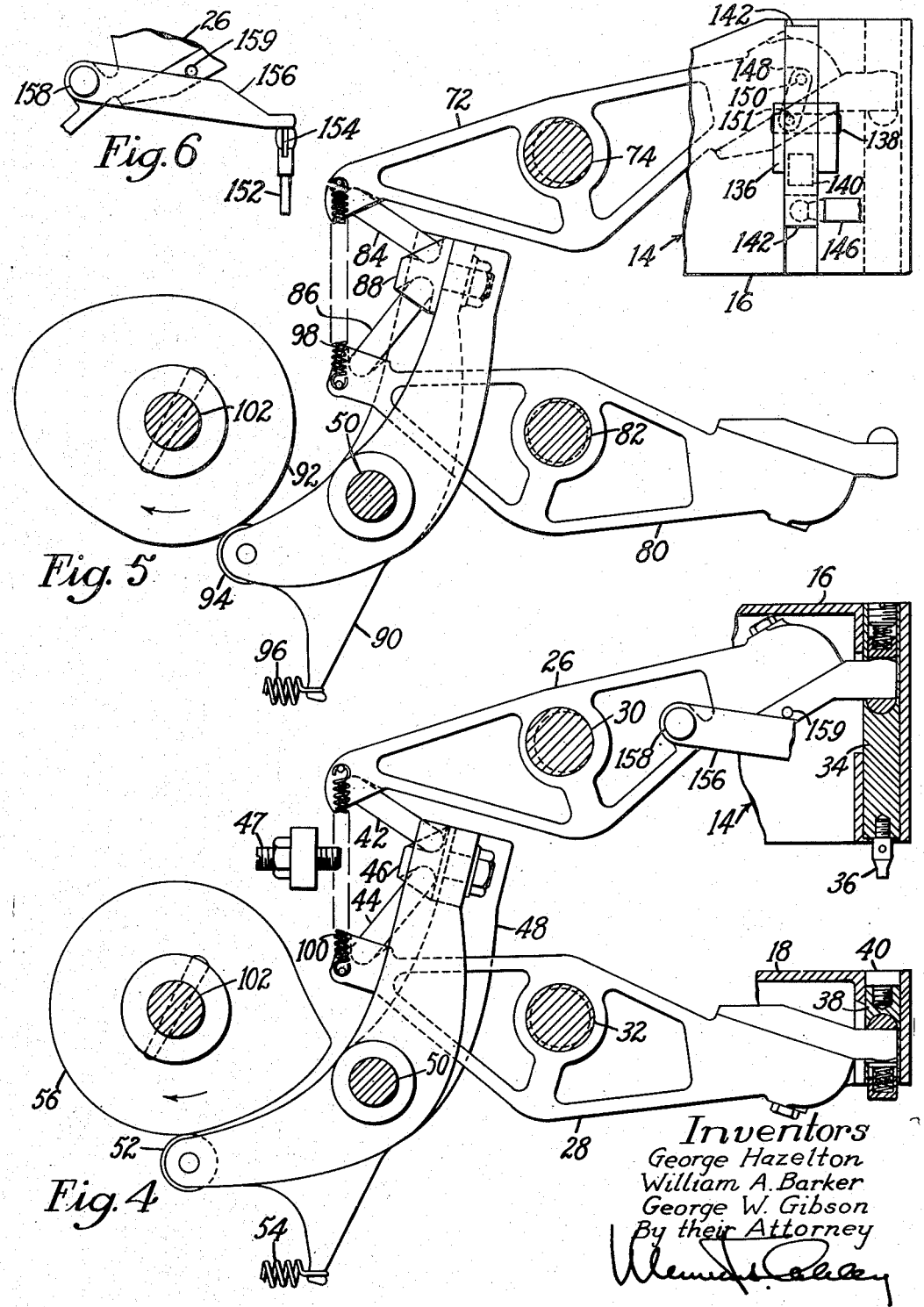

UNITED STATES PATENT OFFICE 2,518,545

PUNCHING AND EYELETING MACHINE

George Hazelton, William Arthur Barker, and George William Gibson, Leicester, England, assignors to United Shoe Machinery Corporation, Flemington, N. J., a corporation of New Jersey Application December 14, 1948, Serial No. 65,182
In Great Britain December 27, 1947

7 Claims. (Cl. 218—15)

This invention relates to power-operated machines for installing barrel-type fasteners and more particularly the invention aims to provide an improved eyelet-setting machine for enabling its operator to insert an eyelet precisely at a selected or designated locality of a work piece. It will be understood, however, that the invention is not necessarily limited to eyeletting machines nor to machines for operating upon any particular type of work piece, such as a shoe upper, since the word "eyelet" as hereinafter used refers to barrel-type fasteners generally, and includes, for instance, such examples as lacing hooks or grommets, as well as eyelets.

For best results, whether intended to serve as fasteners, pivots, decorations, hole reinforcements, or to fulfill any combination of these jobs, an eyelet must be properly set and moreover the setting must occur where the work requires it. Mislocation of punching or setting makes for defective workmanship especially since the fastener can seldom be relocated to correct an installation error without damaging, or even ruining the work piece. As presently constituted, eyeleting machines will ordinarily insert eyelets automatically and approximately at the points specified to receive them. Where the eyelets are to be unevenly spaced and a high degree of accuracy in placing each eyelet is important, preliminary manual positioning of the work piece and the driven working members in correct relation to each other has been found especially advantageous. The invention is accordingly herein illustrated as embodied in a machine for precisely inserting eyelets, one at a time, in a work piece held against displacement, the machine having in its novel organization elements which are in part manually operable to enhance safety, accuracy, and effective performance of power-driven parts. In general, the arrangement includes a pair of cooperatively-related punching members movable sidewise with a pair of cooperatively-related eyelet-setting members, said pairs being alternately driven along a selected line of operation to punch a hole and then clinch an eyelet in said hole.

An object of the invention is to provide in a powered machine improved means for installing an eyelet precisely at a chosen locality of a work piece.

An important feature of the invention relates to an eyelet-setting machine having manually operable means for initially moving a punching member toward the work piece to facilitate relative positioning of the latter and thereby precisely locate a spot for installing an eyelet, further operation of said manual means subsequently actuating powered punching and clinching mechanism exactly at said spot.

A further feature of the invention consists in improved means for guiding an eyelet into its punched hole, a frictionally controlled spindle associated with one of the eyelet-setting members being thrust through an eyelet in a raceway in consequence of initial manual operation of the punching mechanism. Actuating the manually moved punching member as a guide to the proper locality for punching an eyelet hole in the work piece thereby serves also to seat an eyelet in coaxial relation to the spindle. When the eyelet has thus been impaled by the spindle and steadied by the delivery end of the raceway during their cooperative sidewise movement of the punched hole, the raceway is deflected without danger of fouling the setting members which are about to be power-operated and the eyelet has then had adequate time to be properly alined with the setting tool before further depression of the spindle urges the eyelet into the punched hole.

These and other features of the invention, together with novel arrangements of parts, will be best understood by considering the illustrative machine described below and with reference to the accompanying drawings, in which:

Fig. 4 is a view in side elevation and partly in section of toggle actuated punching members and associated driving mechanism shown in Fig. 1;

Fig. 5 is a view in side elevation of the toggle actuated eyelet-setting mechanism and the eyelet picking spindle;

Fig. 6 is a detail view in elevation of mechanism for actuating the spindle;

Figure 2:
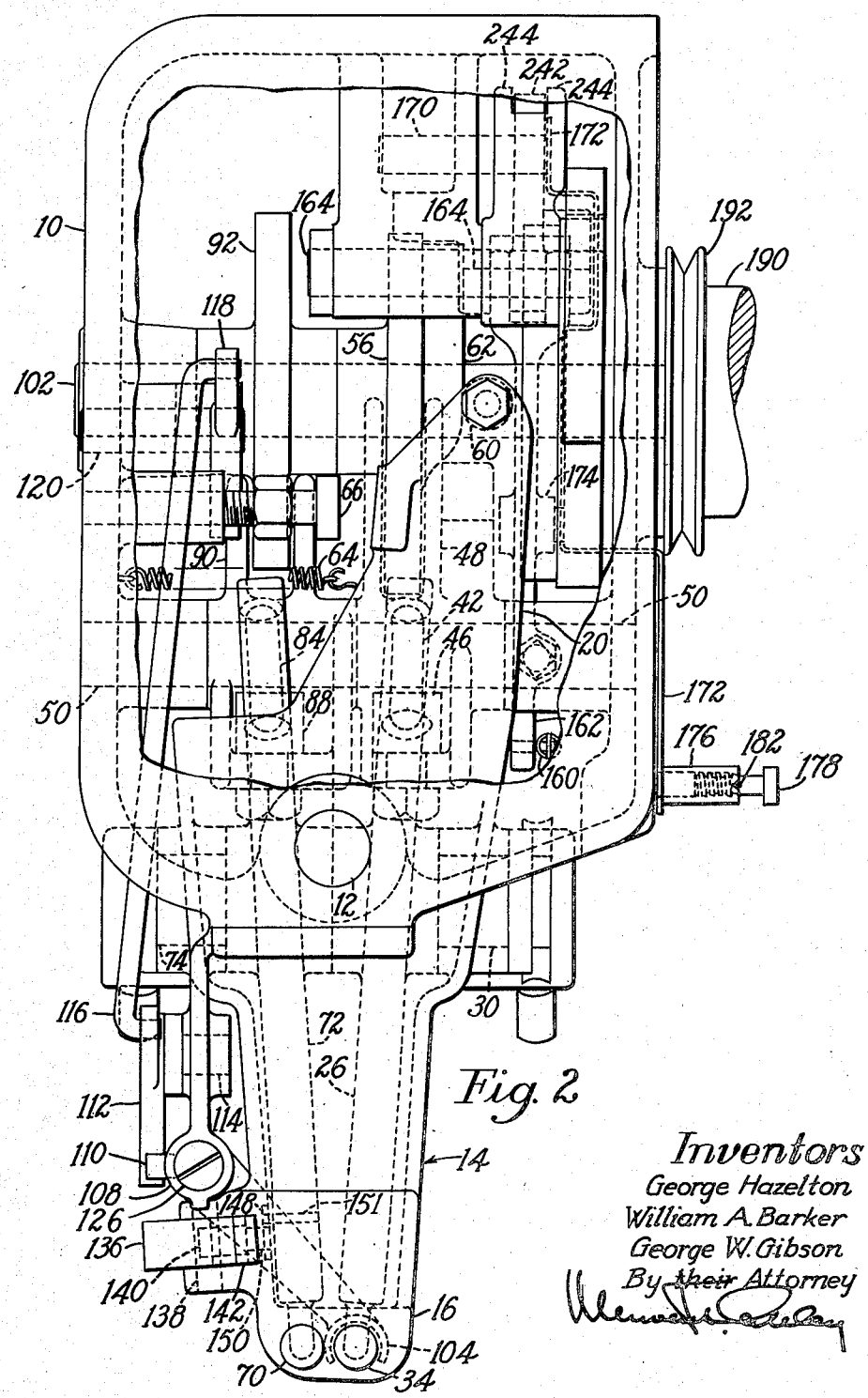
Fig. 2 is a plan view of the same machine with a portion broken away.
Figure 3:
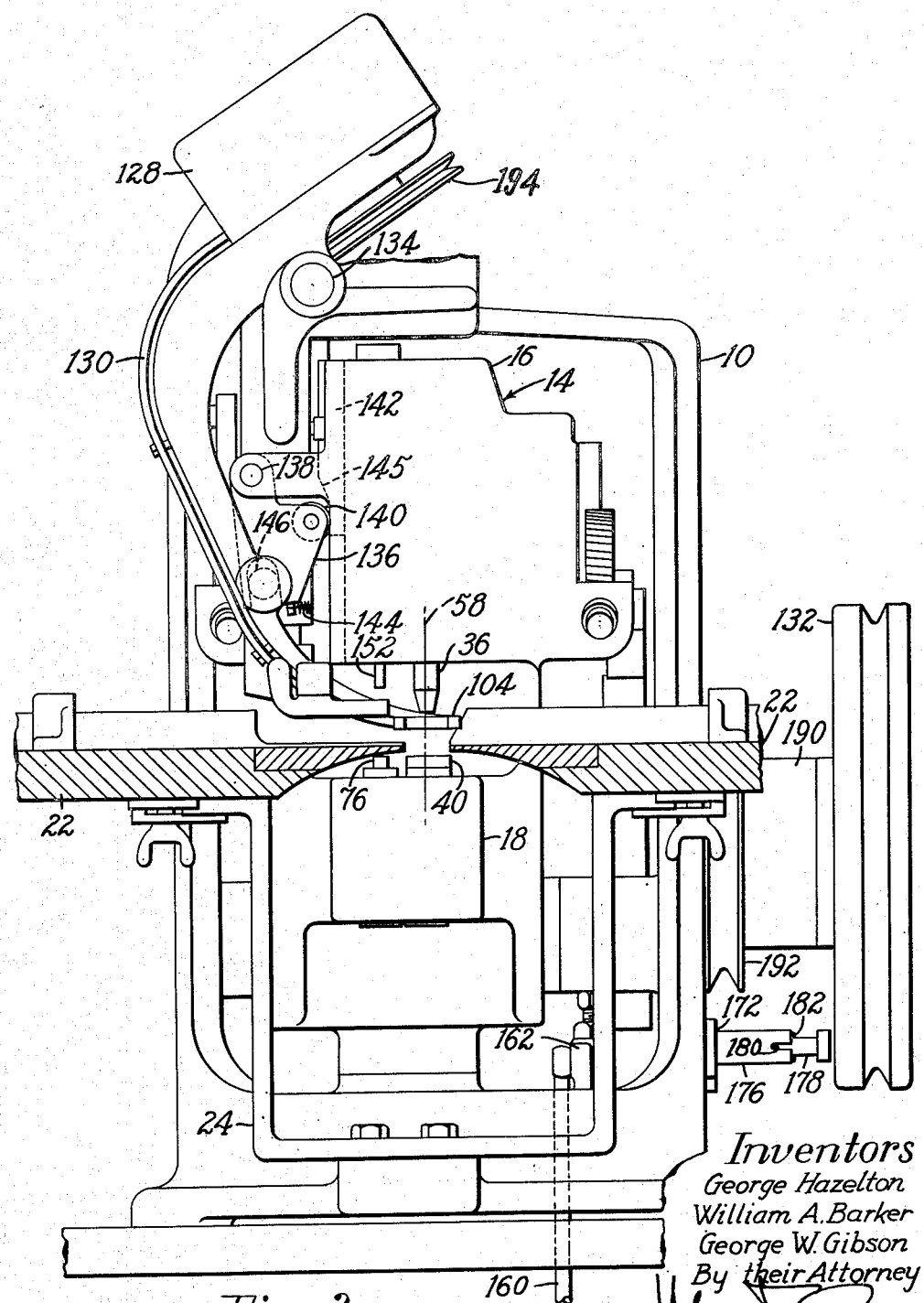
Fig. 3 is a view in front elevation, the work table and raceway included.

The illustrative machine comprises a hollow, open front main frame 10 in which trunnions 12 (Figs. 1 and 2) are journaled to establish a vertical axis for the angular movements of a carrier 14. The carrier 14 includes forwardly extending arms 16 and 18, and has, for purposes later to be explained, a rearwardly extending arm 20. A work table 22, Fig. 3, is clamped to a bracket 24 secured to the frame 10 and has an opening disposed vertically between the forward ends of the arms 16 and 18 to allow consecutive operation upon a work piece of punching and setting mechanism arranged side by side in said arms as will now be described.

Upper and lower punching levers 26 and 28, respectively, (Fig. 4) are pivotally mounted on their individual bearing pins 30, 32 which are respectively carried by the arms 16 and 18. A plunger 34 to which a tubular punch 36 is affixed is mounted for vertical movement within a bore in the arm 16 and is engageable with an end of the lever 26. Similarly, a plunger 38, to which a punch block 40 is affixed, is mounted for vertical movement in a bore of the arm 18 and is engageable with an end of the lever 28. The punch 36 and punch block 40 are alined and their cooperative engagement with a work piece is effected by pivotal movement of the levers 26 and 28 in opposite directions about the bearing pins 30, 32.

A toggle for operating the punch and the punch block is located between the rear ends of the levers 26 and 28 (Fig. 4). In comprises toggle links 42 and 44 and an intermediate knee-block 46. Movement of the latter in one direction is limited by an adjustable stop 47. Hemispherical ends formed on the links have bearings in hemispherical sockets formed in the levers 26 and 28 and in the block 46. These formations permit angular movements of the carrier 14 about the trunnions 12, also angular movements of the levers 26 and 28 about their respective fulcra 30 and 32, and angular movements of the operating lever 48 to which the knee block 46 is affixed. The lever 48 is mounted on a fulcrum pin 50 and is provided with a cam roll 52. A tension spring 54 keeps the roll in contact with a peripheral cam surface 56 of a rotary cam (Figs. 1, 4 and 6) by which the punch and punch block are moved toward and from each other.

As mentioned above, the pair of punching members is movable sidewise with a pair of cooperatively related eyelet setting members hereinafter to be described, the sidewise movement being effected by swinging of the carrier 14 as a whole about the trunnions 12. The means for so turning the carrier 14 and thereby moving the aforesaid pairs of operating members alternately toward and from a common operating axis, designated 58 in Fig. 3, comprises the arm 20 (Figs. 1 and 2), and a roll 60 carried thereby for engagement with a peripheral cam surface 62 of a rotary cam. The roll 60 is held against the cam surface 62 by a spring 64 (Fig. 2), and an adjustable stop 66 (Fig. 2) is arranged to be engaged by the carrier 14 whereby to arrest the pair of eyelet setting members in alinement with the axis 58 and a hole in the work piece from which the punch 36 has been withdrawn.

Figure 1:
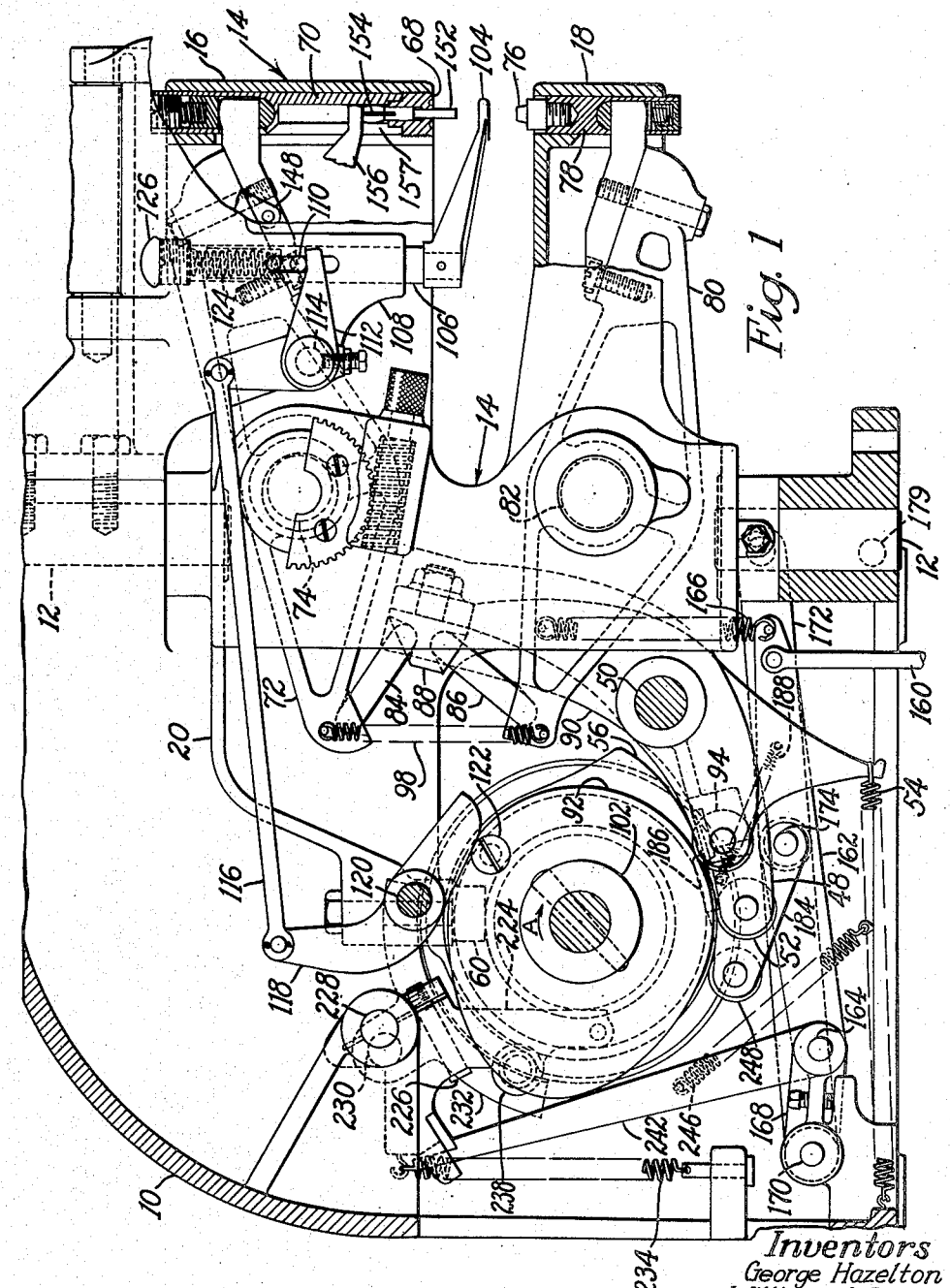
Fig. 1 is a left hand side elevation of an eyeleting machine in which the invention is embodied, the machine being shown partly in section, a portion being broken away, and the work table and raceway being omitted for clarity.

Referring now to Fig. 1, an upper eyelet setting die 68 is affixed to a plunger 70 mounted for vertical movement in a bore in the arm 16. Vertical movement is imparted to the plunger 70 by a lever 72 mounted on a fulcrum pin 74 carried by the arm 16. A lower setting die 76 is affixed to a plunger 78 mounted for vertical movement in a bore in the arm 18, and movement is imparted to this plunger by a lever 80 mounted on a fulcrum pin 82 carried by the arm 18. The levers 72 and 80 are operated by a toggle mechanism (Fig. 5) similar to that provided for operating the punch 36 and the punch block 40. The mechanism represented in Fig. 5 comprises toggle links 84 and 86, a knee block 88, a lever 90 to which the knee block is affixed, a rotary cam 92, a cam roll 94 carried by the lever 90, and a spring 96 by which the cam roll is held against the operating surface of the cam 92. The ends of the toggle links 84, 86 are hemispherical and the bearing surfaces provided for them in the knee block 88 and in the levers 72, 80 are correspondingly shaped.

A spring 98 connecting the levers 72, 80, as shown in Fig. 5, holds them against the links 84, 86. A similar spring 100 connects the levers 26, 28 (Fig. 4) and holds them against the links 42, 44.

Referring again to Figs. 1 and 2, as has been noted, the power operated working elements are cam actuated, the several cams being secured to, and driven in appropriate timing sequence by, a main driving shaft 102 journaled in hubs provided in the frame 10. Thus, a presser foot 104 is secured to the lower end of a rod 106 mounted for vertical sliding in a boss 108 of the frame 10, the presser foot being conveniently arranged to be lowered to grip the work against the table 22. A pin 110 affixed to the rod 106 extends through a slot in the boss 108 and cooperates with one arm of a bell crank 112 pivoted upon a stud 114 secured to the frame 10. A rearwardly extending rod 116 is pivotally connected to the bell crank 112 and to a lever 118. The latter is pivoted upon a stud 120 secured to the frame and has a lower end engageable with a roll 122 (Fig. 1) carried by the above mentioned eyelet setting cam 92 mounted on the shaft 102. The lever 118 is intermittently held in operative contact with the roll 122 by means of a spring 124 confined by an upper end of the rod 106 and a cap screw 126 threaded in the boss 108. During a revolution of the shaft 102, in the direction indicated by the arrow A of Fig. 1, it will be seen that the roll 122 first passes the lever 118 to allow the foot 104 to be lowered by the spring 124 and thereafter lifts the lever 118 and the foot 104.

Means for rotating a hopper 128 to supply eyelets to a raceway 130 and for deflecting the latter cyclically are also powered by the main shaft 102 which, incidentally, is driven continuously by a belt-operated pulley 132 mounted thereon. The raceway 130 is mounted on the frame 10 (Fig. 3) and is connected thereto by a pivot pin 134 that enables its delivery end to swing sidewise, but the raceway and the arm 16 of the tool-carrier 14 are connected by a coupling member 136 suspended from the arm 16 by a pivot pin 138. A roll 140 carried by the member 136 is normally held against a vertically movable block 142 by a tension spring 144 (Fig. 3) secured to the carrier 14, the block being embedded in a groove in the arm 16 and having a camming surface 145 (Fig. 3) by which the roll 140 may be shifted to the left. The lower portion of the coupling member 136 straddles and embraces a pin 146 affixed to the raceway. The block 142 is carried up and down by the lever 72 (Fig. 5) to which it is connected by a link 148, a pivot pin 150 (Figs. 2 and 5) affixed to the block, and a pivot pin 151 affixed to the lever. The effect of the block 142 is to deflect the delivery end of the raceway out of the path of the setting die 68 as the latter descends.

The means for picking eyelets from the raceway 130 for insertion one at a time comprises a spindle 152 (Figs. 1 and 6). The spindle 152 and the die 68 are telescopically related (Fig. 1), the upper portion of the spindle being divided by a diametrically placed kerf 154 and its half sections slightly spread to maintain pressure against the interior surface of the plunger 70. The friction due to such pressure is enough to support the spindle but the latter may be depressed by a finger 156 (Figs. 1, 4 and 6) that projects into the plunger 70 through a slot 157. This finger is carried by the punching lever 26 (Fig. 6) and is connected thereto by a pivot member 158. Upward movement of the finger 156 is limited by a stop pin 159 (Figs. 4 and 6) secured in the lever 26. Consequently, the spindle 152 is thrust through an eyelet in the raceway by the punching mechanism prior to the actuation of the plunger 70, the initial position of the spindle (and normal inoperative position of the machine) being as represented in Fig. 3 with the spindle slightly above the delivery end of the raceway. Therefore, although the spindle receives its initial downward movement from the finger 156 prior to being shifted sidewise into alinement with a punched hole in the work, it receives a subsequent downward movement after it has been so shifted, its second stage of downward movement being caused by the plunger 70 and the frictional engagement of the spindle therewith. If the hole made in the work by the punch 36 is large enough to receive the lower end of the spindle 152 the latter may descend until it is arrested by the anvil or lower setting die 76. This secondary depression of the spindle occurs simultaneously with depression of the raceway cam block 142, the timing of which advantageously enables the lower end of the spindle to enter the punched hole before the raceway is retracted from the eyelet then surrounding the spindle.

Provision is made for treadle control of the punching mechanism until the operator decides he has located a work piece precisely with respect to the fixed axis 58 along which installation is to occur. By means of a treadle (not shown) connected to a treadle rod 160 (Figs. 1, 3 and 7) conventional clutch mechanism is tripped to drive the main shaft 102 through a single powered revolution during which, as will be seen, an eyelet installation will be completed. The treadle rod 160 is connected to a lever 162 pivoted on a movable stud 164 at one end and having its other end yieldingly suspended from the frame against treadle depression by a spring 166. A link 168, likewise pivoted on the stud 164, is pivotally connected to the machine frame by a pin 170. A lever 172, having its rearward end pivotally supported by the pin 170, is also pivotally connected to the lever 162 by a movable stud 174. The forward end of the lever 172 (Fig. 3) extends outside the frame 10 and is provided with a boss 176 for receiving a horizontally slidable spring pressed control pin 178. The boss 176 has a diametric slot 180 which may accommodate a transverse pin 182 secured in the pin 178. When the latter is turned to seat the pin 182 within the slot, the control pin 178 is in its inner position, and when the pin 182 is unseated, as shown in Fig. 3, the pin 178 is in its extended or normal position, these two positions determining operative conditions hereinafter to be explained. During operations with the control pin in its inner position an end thereof is inserted in a bore 179 (Fig. 1) of the frame 10 to lock the link 168. The stud 174 pivotally supports a latch 184 (Fig. 7) which is provided with a lip 186 that overlies an end portion of the lever 48. A tension spring 188 secured to the lever 162 tends to hold the lip 186 in pressural engagement with the aforementioned end portion of the lever 48.

Figure 8:
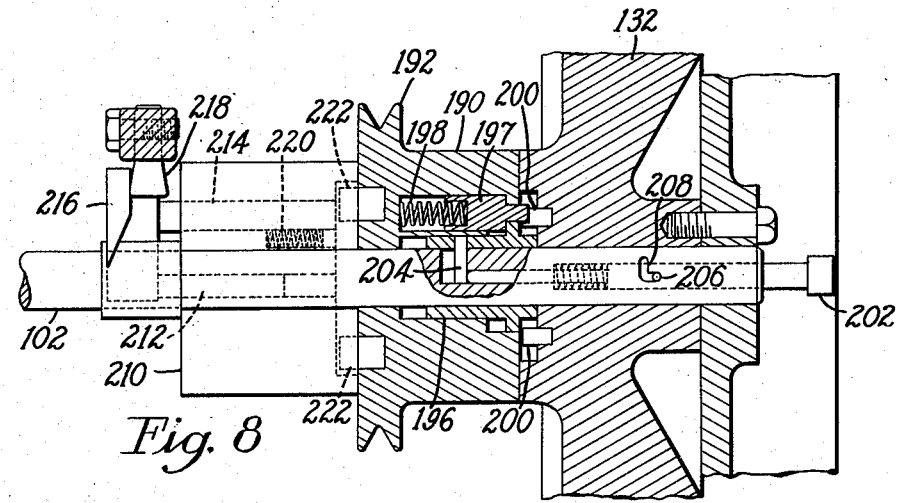
Fig. 8 is a detail in plan of operating parts of the clutch of Fig. 7.

Any suitable type of single revolution clutch may be used to operate the shaft 102, and as the construction and operation of the type shown are well known it will be but briefly described. Referring to Fig. 8, a freely rotatable member 190 is mounted on the shaft 102 adjacent to the continuously driven pulley 132 also freely rotatable upon the shaft 102. The member 190 has a pulley portion 192 for driving a belt (not shown) to operate a hopper pulley 194. Slidably mounted on the shaft 102 and within the member 190 is a sleeve 196 and the member 190 also has an eccentric bore in which a slidable dog 197 is mounted. Normally, as in Fig. 8, the dog 197 is urged by a spring 198 into the path of two dogs 200 affixed to the pulley 132 so that the latter and the member 190 are coupled for continuous rotation as a unit. For safety and convenience a spring pressed plunger 202 slidable in a bore of the shaft 102 may, however, disengage the dogs 197 and 200 by displacing an extension 204 of the sleeve 196 against the resistance of the spring 198, and the machine cannot then be operated. A pin 206 secured to the plunger 202 projects into an angular slot 208 formed in the shaft 102, one portion of the slot serving, when the plunger has been manually pressed inwardly and turned, to releasably retain the pin 206 so that the dogs 196 and 200 are then held out of operative engagement.

A collar 210 fixed on the shaft 102 adjacent to the member 190 receives in parallel bores two plungers 212 and 214 which are secured to a wedge-shaped beak 216. When the machine is at rest, the beak 216 is held by a clutch pin 218 in the position illustrated in Fig. 8. The pin 218 may be withdrawn from the beak by manual means to be described, whereupon the beak and the plungers 212, 214 will be moved by a compression spring 220 toward the member 190, the plunger 214 making coupling engagement with one of the dogs 222 affixed to the member 190. The collar 210 and the shaft 102 will then be driven until the beak 216 is again permitted to resume its relative position shown in Fig. 8.

The pin 218 (Fig. 7) is secured to and actuated by a split lever 224 that is clamped by a bolt 226 to a bearing stud 228 rotatably mounted in bearings in the frame 10. An eccentric portion 230 of the stud 228 pivotally supports an arcuate brake shoe 232. A tension spring 234 connected to the machine frame and to a hook formed on the lever 224 positions the latter so that the pin 218 holds the beak 216 in its initial position shown in Fig. 8 and the brake shoe 232 is applied to a peripheral brake cam 236 on the collar 210. A roll 238 carried by the lever 224 is at this time occupying a depression 240 formed on the brake cam 236. The lever 224 is actuated by an arm 242, the lower end of which is pivotally mounted on the stud 164 and the upper shouldered end of which is received between ears 244 (Fig. 2) of the lever 224. The arm 242 is normally held with its shoulder in engagement with the lever 224 by a tension spring 246 secured to the arm 242 and the machine frame.

A single cycle of operation of the machine in its normal condition, i. e., with the control pin 178 extended as in Fig. 3, will now be described.

Figure 7:
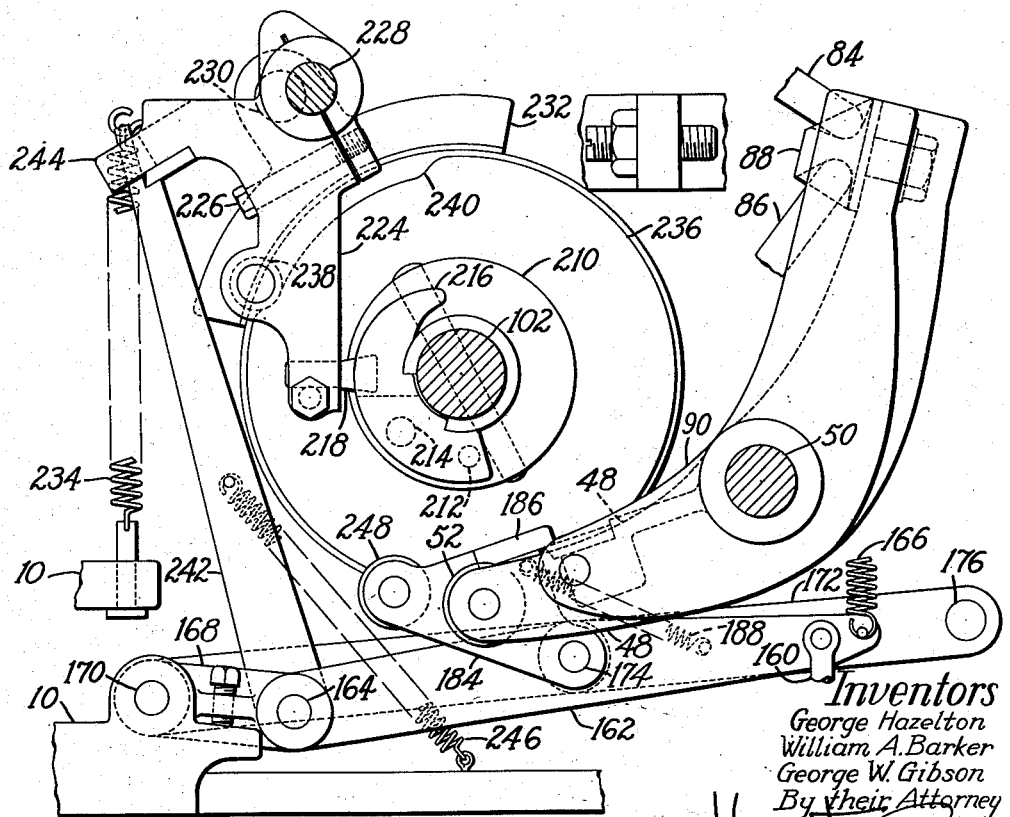
Fig. 7 is an enlarged side elevation of clutch mechanism seen in Fig. 1.

As shown in that view, the presser foot 104 is up and the machine is at rest with the punch 36 and punch block 40 on the fixed operating axis 58. An operator will depress the treadle rod 160 initially to cause, in the manner stated below, a work piece on the table 22 to be gripped by the punch and punch block. If the operator decides these punch members and their operating axis do not intersect the work piece exactly where it is desired to have the eyelet hole located, he will release the treadle and correctly locate the work piece with respect to the punching members, again utilizing the easily visible locality of engagement of the punch 36 with the work as an eyelet hole position indicator. Depressing the rod 160 pivots the lever 162 about the stud 164, and the latch 184 is thereby lowered causing its lip 186 to engage and swing the lever 48 counterclockwise (as seen in Fig. 7) about its fulcrum pin 50. Resultant toggle straightening at the knee block 46 pivots the levers 26, 28 to operate the punching members along the axis 58, downward movement of the lever 162 and the latch 184 being arrested by stoppage of angular movement of the lever 48 when said members have gripped the work. The lever 162 cannot then be swung further downward about the stud 164 and continued downward pull on the treadle rod 160 thereafter swings the lever 162 about the stud 174 as fulcrum. Thus, as a consequence of this continued pull, the arm 242 is moved upwardly to trip the clutch mechanism and start the single powered revolution of the shaft 102 by the release of the brake shoe 232 from the brake cam 236 and the withdrawal of the pin 218 to permit the plunger 214 to be projected by the spring 220 into the path of one of the studs 222, as referred to above.

During the early part of the power cycle rotation of the cam 92, fixed to the shaft 102, will move the roller 122 out from under the lever 118 (Fig. 1) and the presser foot 104 will be lowered by the spring 124 to grip the work piece to hold it against displacement and, when the punching and setting has been completed, the eyelet setting cam 92 will act via said roll 122 and the lever 118 to raise the presser foot for release of the work and subsequent eyeleting.

As the cycle commences, the punch operating cam 56 engages a roll 248 carried by the latch 184 to pivot the latter counterclockwise, as viewed in Fig. 7, about its fulcrum 174 thereby disengaging the latch lip 186 from the lever 48. As a result, the movements of the punch 36 and the punch block 40 toward one another and then apart are thereafter determined by engagement of the roll 52 with the punch operating cam 56. It is to be noted (Figs. 4 and 6) that as these punching members approach one another the finger 156 is depressing the spindle 152 downwardly, as aforesaid, to thrust the latter through the endmost eyelet in the raceway 130. When the eyelet has been so impaled and the punching members are again separated from each other to clear the punched hole, the carrier 14 is shifted angularly (to the right in Fig. 3) about the trunnions 12 as to remove the punch 36 and punch block 40 from, and aline the setting tools with, the axis 58. This shift is effected by the roll 60 and cooperating cam 62 (Fig. 2), its extent being modified by the adjustment of the stop 66 as may occasionally be required to insure that eyelet insertion and setting occurs exactly on the axis 58. The delivery end of the raceway 130 is shifted with the setting tools, an eyelet thereby being steadied on the spindle even though their engaging circumferences may not always exactly fit one another, and positioned just above the punched hole. At this stage in the cycle the spindle 152 receives its second downward thrust, this time from frictional engagement with the plunger 70 as actuated by the cam 92, the plungers 70 and 78 being toggle actuated by means previously referred to and seen in Figs. 1 and 5, to effect cooperative setting by the dies 68 and 76 along the axis 58. The lower end of the spindle 152 will have just entered the punched hole to seat an eyelet therein when the raceway cam block 142 also being lowered by the lever 72 (Fig. 5) acts to deflect the raceway and thereby clear the operating path of the dies 68 and 76 which cooperate to clinch the eyelet. The spindle may remain stationary as the die 68 completes its downward movement but is lifted frictionally by the latter. Further rotation of the cam 92 allows the roll 94 to rise, the spring 98 breaking the toggle at the knee block 88 to separate the dies.

Toward the end of the single revolution the cam 56 contacts the arm 242 to dislodge its shoulder portion from the lever 244. The spring 234 then urges the roll 238 to drop into the cam depression 240, in which position the clutch pin 218 comes into the path of the beak 216 and the brake shoe 232 is applied to the cam 236. Through a small angle of rotation the clutch pin progressively engages an inclined face of the beak 216 to urge the latter away from the member 190. The plunger 214 is thereby uncoupled from the dog 222 so that the shaft 102 is brought to rest and the cycle completed. Upon release of the treadle the machine parts will be returned to their respective initial positions by the tension of their associated springs and the machine is ready for installation of the next eyelet.

If the control pin 178 be inserted in the bore 179, the pin 182 being seated in the slot 180, the lever 172 cannot then be swung about the pin 170 and the illustrative machine is conditioned for installing eyelets which need not be precisely located in a work piece. The stud 174 has thus been given a fixed position and is lower than formerly so that the latch 184 is free from engagement with the arm 48. Depression of the rod 160 swings the lever 162 about the stud 174 to raise the arm 242 and thus apply power as was described above, but the punch operating cam 56 cannot in this operative condition lower the punch 36 until the clutch has been tripped. The operator may accordingly trip the clutch mechanism immediately by his treadle motion and the cycle commences with power operation of the punching mechanism rather than with precise preliminary manual location of the punching members.

Having thus described our invention, what we claim as new and desire to secure by Letters Patent of the United States is:

1. An eyelet setting machine comprising a pair of cooperatively related punching members, means for holding a workpiece stationary between said members, a raceway for supplying eyelets, a pair of cooperatively related eyelet setting members one of which is arranged to cooperate with said raceway and has a frictionally controlled spindle for picking an eyelet therefrom, manually operable means for initially moving one of said punching members in a line of operation toward the workpiece, mechanism actuated by said means for thrusting said spindle through an eyelet in the raceway, a clutch actuable by said means after the initial movement of said punching member, and power operated means arranged alternately to drive said pairs of members in the line of operation, said power operated means being driven by said clutch.

2. An eyelet setting machine comprising a work supporting table, a pair of cooperatively related punching members, a pair of cooperatively related eyelet setting tools, a presser foot overlying the table to hold a workpiece stationary between the members and between the tools, a carrier in which said pairs are arranged side by side, manually operable means for depressing one punching member to a level near the upper surface of the table, a raceway for supplying eyelets, a frictionally controlled spindle telescopically related to one of the tools and arranged to cooperate with the raceway, mechanism actuated by said manually operable means to thrust said spindle through an eyelet in the raceway, a clutch controlled by said means to be tripped thereby in consequence of depressing said punching member lower than said level, power actuated means driven by said clutch to move said carrier to and fro to place said pairs of members and tools alternately in a line of operation adjacent to said presser foot, power actuated means arranged to operate said punching members in said line, and power actuated means arranged to operate said eyelet setting tools in said line.

3. A machine for installing fasteners comprising a table for holding a workpiece stationary, a punch and an individual fastener setting tool above the table, a punch block and a fastener setting die below the table, said punch and punch block being jointly movable toward one another to determine a locality for installing a fastener, a deflectable raceway, a spindle telescopically mounted in said tool and arranged to cooperate with said raceway, manually operable means arranged to depress the punch to a level above said locality, mechanism actuated by said means to thrust the spindle through the fastener in the raceway, a clutch controlled by said means to be tripped in consequence of depressing the punch below said level, and power actuated means driven by said clutch for alternately operating the setting tools and the punch at said locality.

4. An eyelet setting machine comprising a pair of cooperatively related punching members, a pair of cooperatively related eyelet setting members, said pairs being respectively mounted for toggle operation and arranged side by side, a stationary work support and a cooperatively related presser foot to hold a workpiece between the punching members, a raceway for supplying eyelets and arranged to cooperate with one of said eyelet setting members, manually actuated means for initially moving said punching members along a line of operation adjacent to said presser foot, a clutch controlled by said means, power operated means driven by said clutch for thereafter alternately moving said pairs of members along said line of operation, and mechanism actuated by said power operated means to operate the presser foot during the movement of said members.

5. An eyelet setting machine comprising a raceway for supplying eyelets, an eyelet setting tool arranged to cooperate with said raceway, said tool having a frictionally controlled spindle for picking an eyelet from the raceway, manually operable means arranged to thrust said spindle through an eyelet in the raceway, a clutch controlled by said means to be tripped thereby, and power operated means for operating said tool, said power operated means being driven by said clutch.

6. An eyelet setting machine comprising a frame, a pair of cooperatively related punching members and a pair of cooperatively related eyelet setting members mounted side by side on said frame for swinging in unison, a spindle telescopically related to one of said eyelet setting members and supported for frictional engagement therewith, a raceway pivotally mounted on the frame and normally having its delivery end in alinement with the spindle, power operated means for moving said punching members toward and from each other to punch a hole in an interposed work piece, mechanism actuated by the punching movement of one of said punching members for initially thrusting the spindle through an eyelet in the raceway, mechanism operable by said means for shifting said pairs of members and the delivery end of the raceway sidewise whereby the latter, said eyelet setting members and said spindle are alined with said punched hole, power operated mechanism for thereafter moving the spindle and subsequently said eyelet setting members into and from the punched hole, and means actuated by said power operated mechanism for retracting the raceway in the interval between entry of said spindle and eyelet setting members in said hole.

7. An eyelet setting machine comprising a pivotally mounted tool carrier, oppositely disposed punching and eyelet setting tools carried thereby side by side, a spindle frictionally mounted in one of said eyelet setting tools and telescopically movable in relation thereto, a raceway normally arranged to deliver and support an eyelet in the path of said spindle, power means for operating said punching tools to punch a hole in a stationary work piece, elements actuated by said means initially to thrust the spindle into an eyelet on the raceway, mechanism for shifting said tool carrier sidewise to aline the setting tools, spindle and raceway delivery end with the punched hole, power mechanism for operating the eyelet setting tools, said power mechanism including a member effective further to thrust the spindle through the eyelet and into the punched hole, and a cam actuated by said first-mentioned mechanism for retracting the raceway from said spindle, said cam being adapted to withdraw raceway support of an eyelet after the latter has been positioned for setting in said hole.

GEORGE HAZELTON.
WILLIAM ARTHUR BARKER.
GEORGE WILLIAM GIBSON.

No references cited.